(12) United States Patent
Kim

(10) Patent No.: US 12,054,193 B2
(45) Date of Patent: Aug. 6, 2024

(54) STEER-BY-WIRE SYSTEM CONTROL APPARATUS AND METHOD

(71) Applicant: HYUNDAI MOBIS CO., LTD., Seoul (KR)

(72) Inventor: Lyoung Tae Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 264 days.

(21) Appl. No.: 17/811,134

(22) Filed: Jul. 7, 2022

(65) Prior Publication Data

US 2023/0014974 A1    Jan. 19, 2023

(30) Foreign Application Priority Data

Jul. 13, 2021   (KR) .................. 10-2021-0091381

(51) Int. Cl.
| | | |
|---|---|---|
| *B62D 15/02* | (2006.01) | |
| *B62D 5/04* | (2006.01) | |
| *B62D 6/00* | (2006.01) | |
| *B62D 3/12* | (2006.01) | |

(52) U.S. Cl.
CPC ......... *B62D 15/025* (2013.01); *B62D 5/0421* (2013.01); *B62D 5/0481* (2013.01); *B62D 6/002* (2013.01); *B62D 6/008* (2013.01); *B62D 3/12* (2013.01)

(58) Field of Classification Search
CPC ........ B62D 3/12; B62D 5/0421; B62D 6/002; B62D 6/008; B62D 15/025
See application file for complete search history.

(56) References Cited

U.S. PATENT DOCUMENTS

2020/0346642 A1*  11/2020  Varunjikar ............ B60W 30/12

FOREIGN PATENT DOCUMENTS

KR    2020-0041399    4/2022

OTHER PUBLICATIONS

English Language Abstract of KR 2020-0041399 published Apr. 22, 2020.

* cited by examiner

*Primary Examiner* — Hung Q Nguyen
*Assistant Examiner* — Mark L. Greene
(74) *Attorney, Agent, or Firm* — DLA Piper LLP US

(57) ABSTRACT

Proposed are a steer-by-wire system control apparatus and method, the apparatus including: a torque overlay control module configured to determine a target steering angle using a torque command input from a Lane Keeping Assistance System; and an actuator control module configured to control a position of a rack according to the target steering angle and thus to control a traveling direction of a vehicle.

10 Claims, 3 Drawing Sheets

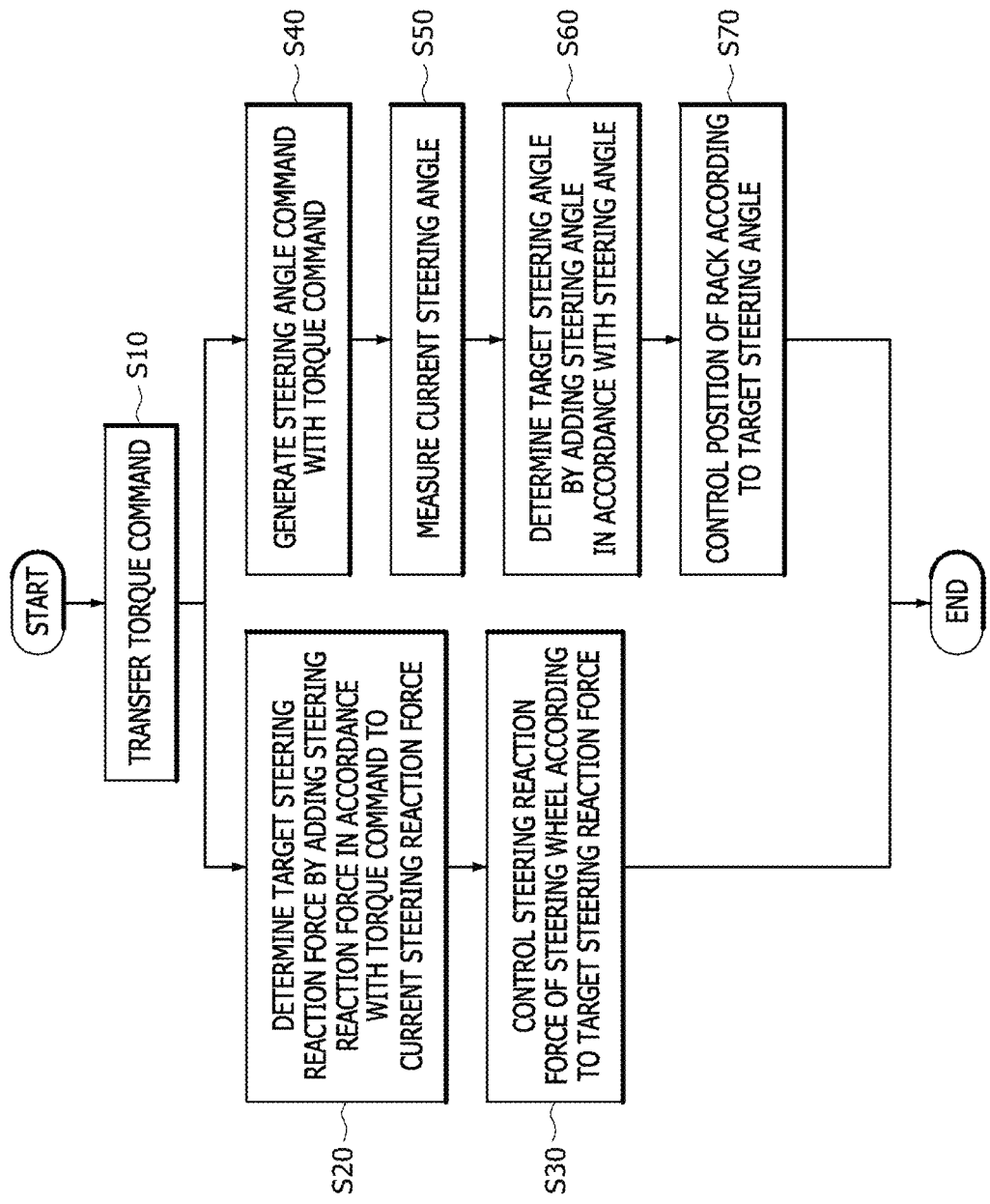

STEER-BY-WIRE SYSTEM CONTROL APPARATUS AND METHOD

CROSS-REFERENCE TO RELATED APPLICATION

This application claims priority from and the benefit of Korean Patent Application No. 10-2021-0091381, filed on Jul. 13, 2021, which is hereby incorporated by reference for all purposes as if set forth herein.

BACKGROUND

Field

Exemplary embodiments of the present disclosure relate to a steer-by-wire system control apparatus and method and, more particularly, to a steer-by-wire system control apparatus and method that are capable of generating a steering angle command corresponding to a torque command received from a Lane Keeping Assistance System and controlling vehicle steering with the generated steering angle command.

Discussion of the Background

A steer-by-wire (SBW) system is a steering system in which a steering wheel and a front wheel of a vehicle are mechanically disconnected from each other.

The SBW system receives a rotational signal of a steering wheel, as an input thereto, through an electronic control unit (ECU) and may steer the vehicle by operating a steering motor connected to a drive wheel on the basis of the input rotational signal.

A mechanical connection structure that is employed by a steering system in the related art is removed from the SBW system. Thus, the SBW system has advantages, such as an increase in the degree of freedom in layout according to a configuration of a steering system, an improvement in fuel mileage, and rejection of disturbance reversely input from a vehicle wheel.

A Lane Keeping Assistance System (LKAS) is a system that detects a traffic lane through a sensor, generates a torque command according to positional information of the detected traffic lane, and thus prevents the vehicle from moving out of the traffic lane thereof.

The LKAS, as an apparatus that uses a torque overlay, sends the torque command to a steering system. When receiving the torque command, the steering system adds an output in accordance with the torque command to an output thereof. With the torque resulting from this addition, traveling direction of the vehicle is changed, and thus the object of control, such as keeping traveling in the traffic lane, can be achieved.

An example of the related art is disclosed in Korean Application Publication No. 10-2020-0041399 (Apr. 22, 2020) titled "WHEEL ALIGNING METHOD AND SYSTEM FOR STEER BY WIRE SYSTEM"

SUMMARY

In the related art, a steering wheel of a steering force actuator (SFA) is rotated with a torque command. A steering angle command of the rotated SFA is transferred to a rack steering actuator (RSA), and thus a position of a rack is changed, thereby changing a traveling direction of a vehicle. In order to change a position of a rack in this manner, a steering wheel of the SFA is first rotated, and thus time delay occurs. There occurs a problem in that accurate control of the position of the rack is difficult to perform.

Various embodiments are directed to a steer-by-wire system control apparatus and method that are capable of generating a steering angle command corresponding to a torque command received from a Lane Keeping Assistance System and controlling a position of a rack of an RSA with the generated steering angle command.

In an embodiment, a steer-by-wire system control apparatus includes: a torque overlay control module configured to determine a target steering angle on the basis of a torque command input from a Lane Keeping Assistance System; and an actuator control module configured to control a position of a rack according to the target steering angle and thus to control a traveling direction of a vehicle.

In the apparatus, the steer-by-wire system control apparatus may further include a steering wheel control module configured to control a steering reaction force of a steering wheel on the basis of the torque command input from the Lane Keeping Assistance System.

In the apparatus, the steering wheel control module and the torque overlay control module each may receive the torque command from the Lane Keeping Assistance System and may operate independently of each other.

In the apparatus, the steering wheel control module may determine a target steering reaction force by reflecting the torque command input from the Lane Keeping Assistance System in the steering reaction force of the steering wheel and may control a reaction force drive unit according to the target steering reaction force.

In the apparatus, the torque overlay control module may include: a setting steering angle determination unit configured to determine a setting steering angle with the torque command input from the Lane Keeping Assistance System; and a target steering angle determination unit configured to determine a target steering angle by reflecting the setting steering angle determined by the setting steering angle determination unit in a current steering angle.

In another embodiment, a steer-by-wire system control method includes: determining, by a torque overlay control module, a target steering angle on the basis of a torque command input from a Lane Keeping Assistance System; and controlling, by an actuator control module, a position of a rack according to the target steering angle and thus a traveling direction of a vehicle.

In the method, the steer-by-wire system control method may further include controlling, by a steering wheel control module, a steering reaction force of a steering wheel on the basis of the torque command input from the Lane Keeping Assistance System.

In the method, the steering wheel control module and the torque overlay control module each may receive a torque command from the Lane Keeping Assistance System and may operate independently of each other.

In the method, in the controlling of the steering reaction force of the steering wheel, the steering wheel control module may determine a target steering reaction force by reflecting the torque command input from the Lane Keeping Assistance System in the steering reaction force of the steering wheel and may control a reaction force drive unit according to the target steering reaction force.

In the method, the determining of the target steering angle may include: determining a setting steering angle with the torque command input from the Lane Keeping Assistance System; and determining a target steering angle by reflecting the setting steering angle in a current steering angle.

The SBW system control apparatus and method provided according to an aspect of the present disclosure are capable of generating a steering angle command corresponding to a torque command received from a Lane Keeping Assistance System and controlling vehicle steering with the generated steering angle command. Thus, the degree of accuracy of the control of the position of the rack and the responsiveness of the control thereof can be improved, and the performance and marketability of a Lane Keeping Assistance System.

BRIEF DESCRIPTION OF THE DRAWINGS

FIG. 3 is a flowchart illustrating an SBW system control method according to a second embodiment of the present disclosure.

DETAILED DESCRIPTION OF THE ILLUSTRATED EMBODIMENTS

Figure 1:
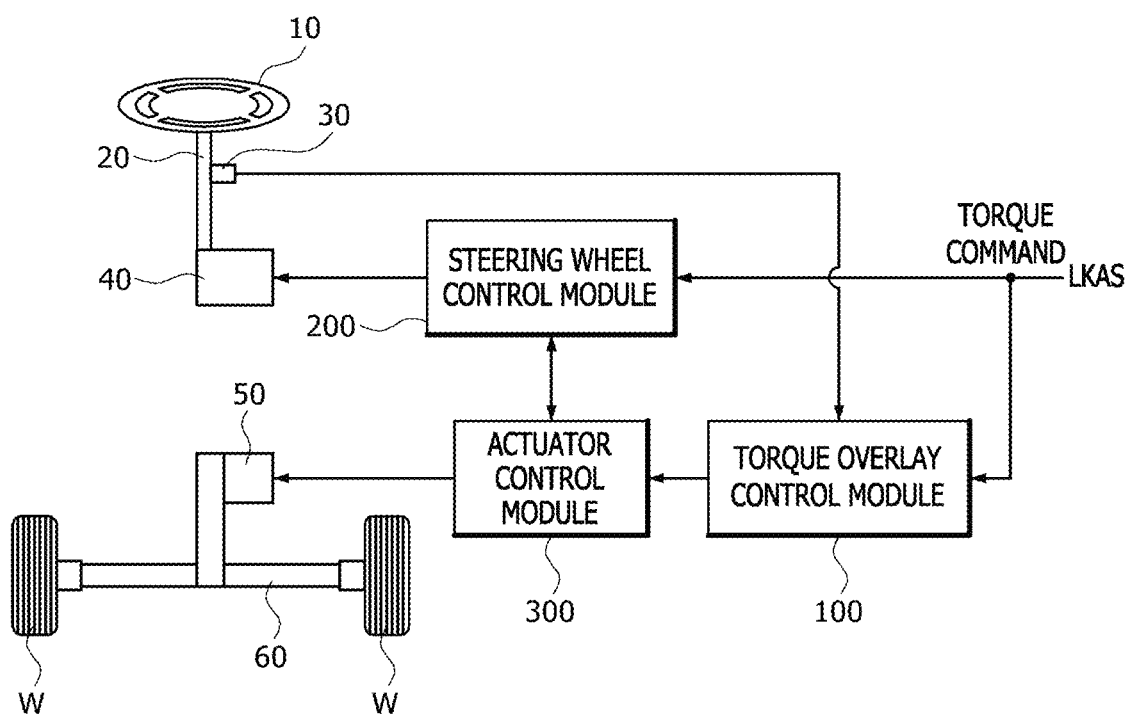
FIG. 1 is a view illustrating that an SBW system control apparatus according to a first embodiment of the present disclosure is installed.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

A SBW system control apparatus and method according to first and second embodiments, respectively, of the present disclosure will be described in detail below with reference to the accompanying drawings. For clarity and convenience in description, the thicknesses of lines and the sizes of constituent elements may be exaggeratedly illustrated in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

Figure 2:
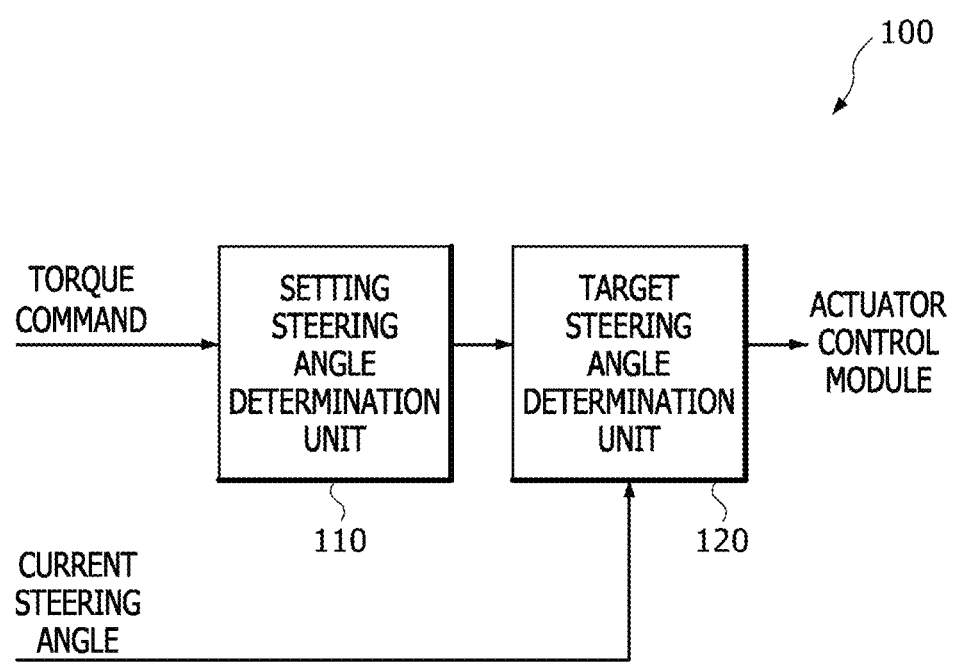
FIG. 2 is a block diagram illustrating a configuration of the SBW system control apparatus according to the first embodiment of the present disclosure.

FIG. 1 is a view illustrating that an SBW system control apparatus according to the first embodiment of the present disclosure is installed. FIG. 2 is a block diagram illustrating a configuration of the SBW system control apparatus according to the first embodiment of the present disclosure.

The SBW system control apparatus according to the first embodiment of the present disclosure receives, as an input thereto, a torque command from a Lane Keeping Assistance System (LKAS) (not illustrated), generates a steering reaction force according to the input torque command, provides the generated steering reaction force to a steering wheel 10, and controls a traveling direction of a vehicle.

The LKAS is an apparatus that uses a torque overlay.

The LKAS detects a traffic lane, generates a torque command according to positional information of the detected traffic lane, transfers the generated torque command to a Steer-by-Wire (SBW) system, and thus prevents the vehicle from moving out of the traffic lane thereof.

The SBW system is a steering system in which the steering wheel 10 and a front wheel W of the vehicle are mechanically disconnected from each other.

With reference to FIG. 1, the SBW system control apparatus according to the first embodiment of the present disclosure includes a torque overlay control module 100, a steering wheel control module 200, and an actuator control module 300.

In FIG. 1, reference numeral 20 refers to a steering column.

The steering wheel control module 200 receives a torque command from the LKAS and controls a steering reaction force of the steering wheel 10 with this torque command.

When turning a steering wheel, the steering wheel control module 200 provides an appropriate reaction force to a driver through a reaction force drive unit 40 and thus provides a feeling of smooth steering to the driver.

In this case, the steering wheel control module 200 determines a target steering reaction force by reflecting the torque command input from the LKAS in the steering reaction force of the steering wheel 10 and controls the reaction force drive unit 40 according to the target steering reaction force.

That is, the steering wheel control module 200 adds a reaction force in accordance with the torque command from the LKAS to the steering reaction force of the steering wheel 10. Thus, torque of the steering wheel 10 increases in a direction in which the vehicle can keep traveling in the traffic lane thereof.

The steering wheel control module 200 may be a Steering Force Actuator (SFA) of the SBW system.

The torque overlay control module 100 determines a target steering angle using the torque command input from the LKAS and transfers the determined target steering angle to the actuator control module 300. In this case, the actuator control module 300 controls a rack drive unit 50 according to the target steering angle input from the torque overlay control module 100 and thus controls a position of a rack 60, thereby controlling a traveling direction of the vehicle.

The steering wheel control module 200 and the torque overlay control module 100 each receive the torque command from the LKAS and operate independently of each other.

That is, the steering wheel control module 200 and the torque overlay control module 100 each receive the torque command from the LKAS In this case, the steering wheel control module 200, as described above, controls the steering reaction force of the steering wheel 10 with the torque command, and the torque overlay control module 100 generates the target steering angle and transfers the generated target steering angle to the actuator control module 300.

In the related art, the steering wheel 10 rotates by the steering wheel control module 200, and with the rotation of the steering wheel 10, the actuator control module 300 controls the position of the rack 60. Thus, there occurs a problem in that accurate control of the position of the rack 60 is difficult to perform.

As described above, according to the present embodiment, the steering wheel control module 200 and the torque overlay control module 100 each receive the torque command from the LKAS and operate independently of each other. Thus, the degree of accuracy of the control of the position of the rack 60 and the responsiveness of the control thereof can be improved, and the performance and marketability of the LKAS can be improved.

The torque overlay control module 100 includes a setting steering angle determination unit 110 and a target steering angle determination unit 120.

The setting steering angle determination unit 110 determines a setting steering angle with the torque command input from the LKAS.

A look-up table or equation for determining the setting steering angle with the torque command input from the LKAS may be created.

Accordingly, when the torque command is input from the LKAS, the setting steering angle determination unit 110 may look up the setting steering angle, corresponding to the torque command, in the look-up table or may determine the setting steering angle by substituting the torque command into the equation.

The target steering angle determination unit 120 determines the target steering angle by reflecting the setting steering angle determined by the setting steering angle determination unit 110 in a current steering angle. The target steering angle determination unit 120 transfers the determined target steering angle to the actuator control module 300.

In this case, the target steering angle determination unit 120 determines the target steering angle by adding the setting steering angle determined by the setting steering angle determination unit 110 to the current steering angle.

The current steering angle may be measured by a steering angle sensor 30 and is not limited to the measurement by the steering angle sensor 30.

The actuator control module 300 drives the rack drive unit 50 connected to the front wheel W on the basis of a rotational signal of the steering wheel 10 in such a manner as to steer the vehicle.

In this case, the actuator control module 300 controls the rack drive unit 50 according to the target steering angle determined by the target steering angle determination unit 120 and thus controls vehicle steering.

A gear box includes a pinion gear that receives a rotational force from a universal joint and a rack bar on which the rack 60 with which the pinion gear is engaged is formed. When the pinion gear rotates, the rack 60 moves the rack bar in a straight line in the leftward-rightward direction. At this point, a force produced by the straight-line movement in the leftward-rightward direction of the rack bar is transferred to the front wheel W through a tie rod and a ball joint. Thus, the traveling direction of the vehicle is changed.

The actuator control module 300 may be a rack steering actuator (RSA) or a road wheel actuator (RWA) of the SBW system.

An SBW system control method according to a second embodiment of the present disclosure will be described in detail below with reference to FIG. 3.

FIG. 3 is a flowchart illustrating the SBW system control method according to the second embodiment of the present disclosure.

With reference to FIG. 3, the LKAS first detects a traffic lane and then generates the torque command according to positional information of the detected traffic lane.

The LKAS transfers the generated torque command to the steering wheel control module 200 and the torque overlay control module 100 (S10).

The steering wheel control module 200 determines the target steering reaction force by adding a steering reaction force in accordance with the torque command received from the LKAS to the steering reaction force of the steering wheel 10 (S20).

Subsequently, the steering wheel control module 200 controls the reaction force drive unit 40 according to the determined target steering reaction force and thus controls the steering reaction force of the steering wheel 10 (S30).

The setting steering angle determination unit 110 determines the setting steering angle with the torque command input from the LKAS (S40).

In this case, the setting steering angle determination unit 110 may look up the setting steering angle corresponding to the torque command input from the LKAS in the look-up table or may determine the setting steering angle by substituting the torque command into the corresponding equation.

In addition, the target steering angle determination unit 120 receives a steering angle measured by the steering angle sensor 30 (S50).

Subsequently, the target steering angle determination unit 120 determines the target steering angle by adding the setting steering angle determined by the setting steering angle determination unit 110 to the current steering angle measured by the steering angle sensor 30 (S60).

The target steering angle determination unit 120 inputs the target steering angle into the actuator control module 300.

The actuator control module 300 controls the position of the rack 60 according to the target steering angle determined by the target steering angle determination unit 120 and thus controls the traveling direction of the vehicle (S70).

In this manner, the SBW system control apparatus and method according to the first and second embodiments, respectively, of the present disclosure are capable of generating the steering angle command corresponding to the torque command received from the LKAS and controlling the vehicle steering with the generated steering angle command. Thus, the degree of accuracy of the control of the position of the rack 60 and the responsiveness of the control thereof can be improved, and the performance and marketability of the LKAS can be improved.

A way of realizing the technical idea of the present disclosure that is described in the present specification may be by taking the form of, for example, a method, a process, an apparatus, a software program, a data stream, or a signal. The above-described feature, although described only in the context of realization in a single form (for example, described as realized in the form of only a method) may also be realized in a different form (for example, in the form of an apparatus or a program). The apparatus may be realized in the form of adequate hardware, software, firmware, or the like. The method, for example, may be realized in an apparatus, such as a computer, a microprocessor, or a processor that generally refers to a processing device, such as an integrated circuit or a programmable logic device. The apparatuses also include a computer that facilitates communication of information between end users, a cellular phone, a portable/personal information terminal (a personal digital assistant ("PDA"), and other communication devices.

The embodiments of the present disclosure are described only in an exemplary manner with reference to the drawings. It would be understandable to a person of ordinary skill in the art to which the present disclosure pertains that various other modifications to the embodiments and equivalents thereof are possible from the description. Therefore, the legitimate technical scope of the present disclosure should be defined by the following claims.

What is claimed is:

1. A steer-by-wire system control apparatus comprising:
   a torque overlay control module configured to determine a target steering angle on the basis of a torque command input from a Lane Keeping Assistance System; and
   an actuator control module configured to control a position of a rack according to the target steering angle and thus to control a traveling direction of a vehicle.

2. The steer-by-wire system control apparatus of claim 1, further comprising:
   a steering wheel control module configured to control a steering reaction force of a steering wheel on the basis of the torque command input from the Lane Keeping Assistance System.

3. The steer-by-wire system control apparatus of claim 2, wherein the steering wheel control module and the torque overlay control module each receive the torque command from the Lane Keeping Assistance System and operate independently of each other.

4. The steer-by-wire system control apparatus of claim 2, wherein the steering wheel control module determines a target steering reaction force by reflecting the torque command input from the Lane Keeping Assistance System in the steering reaction force of the steering wheel and controls a reaction force drive unit according to the target steering reaction force.

5. The steer-by-wire system control apparatus of claim 1, wherein the torque overlay control module comprises:
   a setting steering angle determination unit configured to determine a setting steering angle with the torque command input from the Lane Keeping Assistance System; and
   a target steering angle determination unit configured to determine a target steering angle by reflecting the setting steering angle determined by the setting steering angle determination unit in a current steering angle.

6. A steer-by-wire system control method comprising:
   determining, by a torque overlay control module, a target steering angle on the basis of a torque command input from a Lane Keeping Assistance System; and
   controlling, by an actuator control module, a position of a rack according to the target steering angle and thus a traveling direction of a vehicle.

7. The steer-by-wire system control method of claim 6, further comprising:
   controlling, by a steering wheel control module, a steering reaction force of a steering wheel on the basis of the torque command input from the Lane Keeping Assistance System.

8. The steer-by-wire system control method of claim 7, wherein the steering wheel control module and the torque overlay control module each receive a torque command from the Lane Keeping Assistance System and operate independently of each other.

9. The steer-by-wire system control method of claim 7, wherein in the controlling of the steering reaction force of the steering wheel, the steering wheel control module determines a target steering reaction force by reflecting the torque command input from the Lane Keeping Assistance System in the steering reaction force of the steering wheel and controls a reaction force drive unit according to the target steering reaction force.

10. The steer-by-wire system control method of claim 6, wherein the determining of the target steering angle comprises:
    determining a setting steering angle with the torque command input from the Lane Keeping Assistance System; and
    determining a target steering angle by reflecting the setting steering angle in a current steering angle.

* * * * *